United States Patent [19]

Hasegawa et al.

[11] Patent Number: 5,316,236
[45] Date of Patent: May 31, 1994

[54] TAPE SUPPLYING AND TAKING UP APPARATUS AND TAPE CASSETTES FOR USE THEREWITH

[75] Inventors: Shinichi Hasegawa, Chiba; Shuichi Ota, Kanagawa; Akihiro Uetake, Tokyo; Takashi Sawada, Kanagawa; Yoichirou Senshu, Kanagawa; Chiaki Sugai, Kanagawa, all of Japan

[73] Assignee: Sony Corporation, Tokyo, Japan

[21] Appl. No.: 991,266

[22] Filed: Dec. 16, 1992

[30] Foreign Application Priority Data

Dec. 27, 1991 [JP] Japan .................. 3-358034

[51] Int. Cl.⁵ .......................................... G11B 15/18
[52] U.S. Cl. ................... 242/200; 242/199; 360/94
[58] Field of Search ............... 242/197, 198, 199, 200, 242/201, 68.1, 68.3, 68.4; 360/94, 96.3

[56] References Cited

U.S. PATENT DOCUMENTS

| | | | |
|---|---|---|---|
| 3,877,656 | 4/1975 | Suzaki | 242/197 |
| 4,173,319 | 11/1979 | Umeda | 242/199 |
| 4,729,046 | 3/1988 | Steipe et al. | 360/94 |
| 4,843,510 | 6/1989 | Meguro et al. | 360/132 |

*Primary Examiner*—Daniel P. Stodola
*Assistant Examiner*—John Q. Nguyen

*Attorney, Agent, or Firm*—William S. Frommer; Alvin Sinderbrand

[57] ABSTRACT

A tape supplying and taking up apparatus is capable of use with either large or small size tape cassettes containing reels which can be of different diameters and rotated with a high degree of accuracy by reel spindles of simple structure. Each tape cassette for use with the apparatus has a shutter of the slide type for closing access holes in the bottom wall of the cassette casing.

Each of the reel spindles has a large size cassette receiving portion for receiving a tape reel of a large size tape cassette coaxial with a small size cassette receiving portion for receiving a tape reel of a small size tape cassette. The small size cassette receiving portion is smaller in diameter and disposed at a higher position than the large size cassette receiving portion. The diameter of a lower end of a reel spindle engaging hole provided in each reel hub of the small tape cassette is smaller than the outer diameter of the small size cassette receiving portion of the reel spindle. The reel spindle engaging hole of the large size tape cassette has, at a lower end portion thereof, an escape portion which is greater in diameter than the outer diameter of the small size cassette receiving portion of the reel spindle but smaller than the outer diameter of the large size cassette receiving portion and such escape portion is higher than the height of the small size tape receiving portion.

8 Claims, 15 Drawing Sheets

TAPE SUPPLYING AND TAKING UP APPARATUS AND TAPE CASSETTES FOR USE THEREWITH

BACKGROUND OF THE INVENTION

1. Field of the Invention

This invention relates to a tape supplying and taking up apparatus and tape cassettes for use therewith, and more particularly is directed to a tape supplying and taking up apparatus for selective use with two types of cassettes having different large and small sizes.

2. Description of the Related Art

A tape supplying and taking up apparatus is known in which two types of tape cassettes of different large and small sizes can be used. One example of a conventional tape supplying and taking up apparatus of the type mentioned is a tape supplying and taking up apparatus employed in certain video tape recorders of the so-called compatible type in which a standard tape cassette for the so-called VHS system and a small size tape cassette, commonly called a C-cassette, can be selectively used.

A VHS standard tape cassette and a C-cassette have certain structural features in common, in that the tape reels and the access holes formed in the bottom wall of the cassette casing for exposing reel spindle engaging holes of the tape reels have the same diameters in both cases. The diameters of the tape reels and of the access holes are determined by the need to maintain accurate rotation of the reels in a VHS standard tape cassette. As a result of the foregoing, in the C-cassette which is of relatively small size, the tape reels are of unnecessarily large diameter so that space is wasted within the cassette casing and only undesirably limited amounts of tape can be accommodated in the C-cassette. Further, the relatively large diameter tape reels require correspondingly large access holes in the bottom wall of the cassette casing, and such large access holes in the bottom wall of the small C-cassette casing are not readily closed by means of a shutter of the kind used on tape cassettes for a digital audio tape recorder.

OBJECTS AND SUMMARY OF THE INVENTION

Accordingly, it is an object of the present invention to provide a tape supplying and taking up apparatus in which both large and small size tape cassettes can be selectively used by means of reel spindles of simple structure, and without the previously mentioned disadvantages of the prior at.

It is another object of the present invention to provide a tape supplying and taking up apparatus, as aforesaid, and in which any of the large and small size tape cassettes can be interchanged with a high degree of accuracy.

It is still another object of the present invention to provide a tape supplying and taking up apparatus, as aforesaid, for selective use with large and small size tape cassettes containing relatively large and small diameter tape reels, respectively, so that utilization of the space within the cassette casings may be optimized.

It is a further object of the present invention to provide a tape supplying and taking up apparatus, as aforesaid, and in which tape cassettes for use with the apparatus can have shutters of the slide type provided on the bottom walls thereof for closing access holes therein when the cassettes are not in use.

It is still a further object of the present invention to provide large and small size tape cassettes particularly suited for use with the tape supplying and taking up apparatus.

In accordance with an aspect of this invention, a tape supplying and taking up apparatus capable of receiving two types of tape cassettes of large and small sizes, respectively, which each contain a pair of tape reels having a tape wound on the tape reels with a tape portion extending therebetween, comprises: a chassis; large and small size tape cassette locating means on the chassis for selectively locating the tape cassettes in respective operative positions thereon; and a pair of reel spindles mounted on the chassis for engaging the pair of tape reels of either one of the large and small size tape cassettes when in its respective operative position, each of the reel spindles having a large size cassette receiving portion for receiving a respective tape reel of a large size tape cassette thereon and a small size cassette receiving portion for receiving a respective tape reel of a small size tape cassette thereon, the large size cassette receiving portion and the small size cassette receiving portion of each of the reel spindles being disposed in coaxial relationship, with the small size cassette receiving portion of each reel spindle having a small diameter and being disposed at a higher position than the large size cassette receiving portion of the respective spindle.

With the above described supplying and taking up apparatus embodying the invention, although the same reel spindles are used for the two different sizes of tape cassettes, the tape reels for the large and small size tape cassettes may be formed with different sizes since the receiving portions of the reel spindles for the large and small size tape cassettes are formed coaxially but are different in diameter and height or vertical position from each other. Thus, the tape reels of a large size tape cassette can be made of a size required for a desired degree of accuracy in rotation which conforms to that size. On the other hand, the tape reels of a small size tape cassette may be made in a suitable size smaller than the tape reels of a large size tape cassette, and consequently, the utilization of space in the casing and the appearance of the small size tape cassette can be improved. Further, by making possible the use of relatively small size tape reels in the small size tape cassette, it is possible to close the access holes used for exposing reel spindle engaging holes of such tape reels by means of a sliding type shutter.

According to another aspect of the present invention, there is provided a small size tape cassette for use with a tape supplying and take up apparatus as defined above, and in which the diameter of the lower end of a reel spindle engaging hole formed in a reel hub of each of the tape reels is smaller than the outer diameter of the small size cassette receiving portion of each of the reel spindles.

According to a further aspect of the present invention, there is provided a large size tape cassette for use with a tape supplying and taking up apparatus as defined above, and in which a reel spindle engaging hole formed in a reel hub of each of the tape reels has a lower end or escape portion with a diameter larger than the outer diameter of the small size cassette receiving portion of the reel spindle but smaller than the outer diameter of the large size cassette receiving portion, and such escape portion is higher than the height of the small size cassette receiving portion of the reel spindle.

The above, and other objects, features and advantages of the present invention, will become apparent from the following detailed description when read in conjunction with the accompanying drawings in which like parts or elements are denoted by like reference characters.

DETAILED DESCRIPTION OF THE PREFERRED EMBODIMENT

Figure 1:
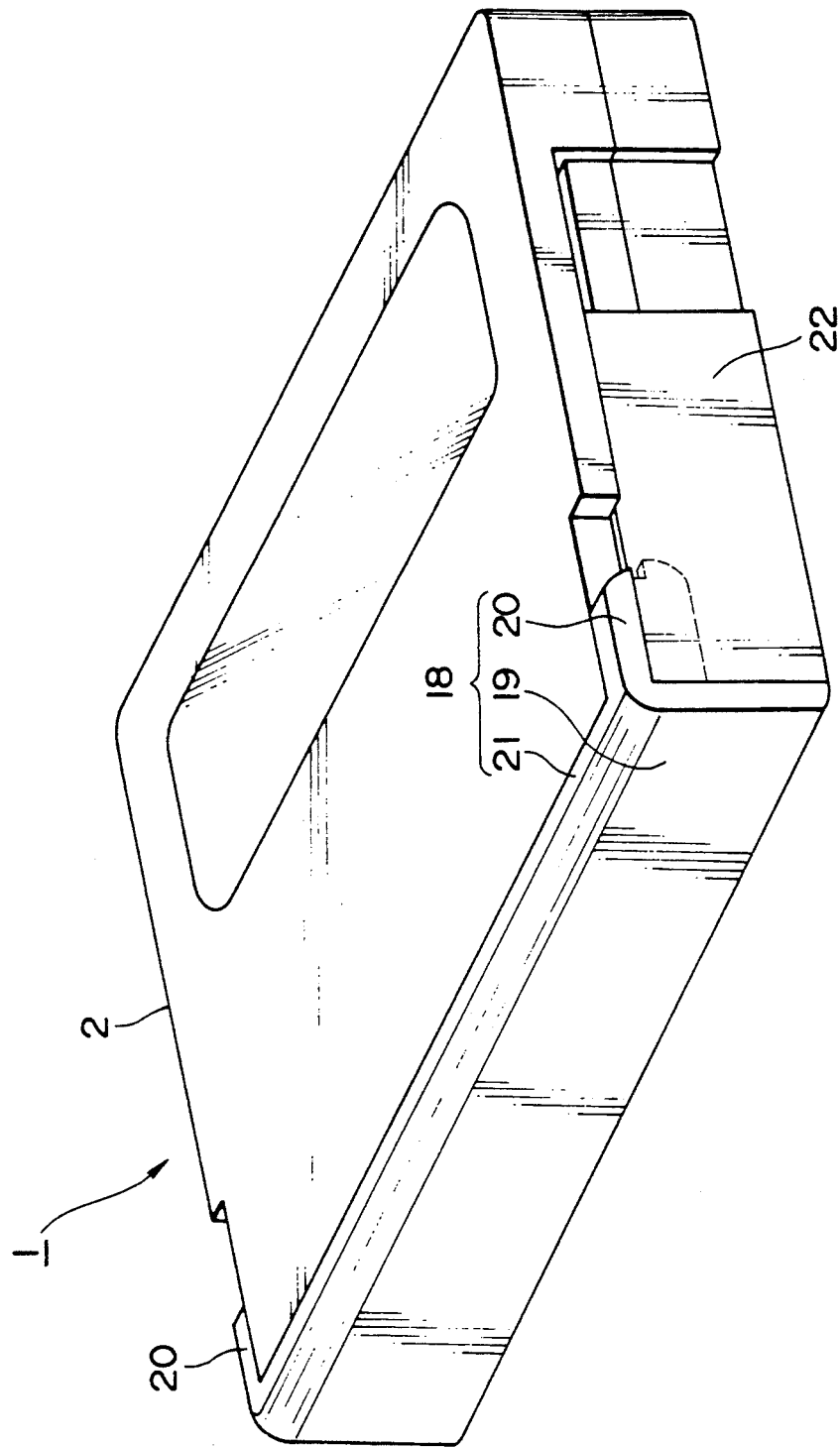
FIG. 1 is a perspective view showing a large size tape cassette according to an embodiment of the present invention, and which is shown with a front lid and a shutter of the cassette in their respective closed positions.

The present invention will now be described in detail below in connection with a preferred embodiment thereof in which it is applied to a video tape recorder of the compatible type, that is, capable of use with large size and small size tape cassettes.

Referring first to FIGS. 1 to 5, there is shown a tape cassette 1 of a large size which includes a cassette casing 2 in the form of a flattened box having a transversely elongated rectangular shape as viewed in plan. The casing 2 has a pair of tape exits 3 (FIGS. 2 and 5) formed at the opposite end portions of the front of the casing which further has a mouth portion 4 between the tape exits 3 opening forwardly and downwardly of the cassette casing 2.

A pair of upright cylindrical tape guides 5 are provided between the tape exits 3 and the mouth portion 4. Each of the cylindrical tape guides 5 has a coaxial positioning hole 6 opening at the bottom of the cassette casing 2.

A pair of access holes 7 are formed in laterally spaced relation in a bottom wall 8 of the cassette casing 2 for exposing reel spindle engaging holes formed in hubs of tape reels, which will be hereinafter described.

Figure 13:
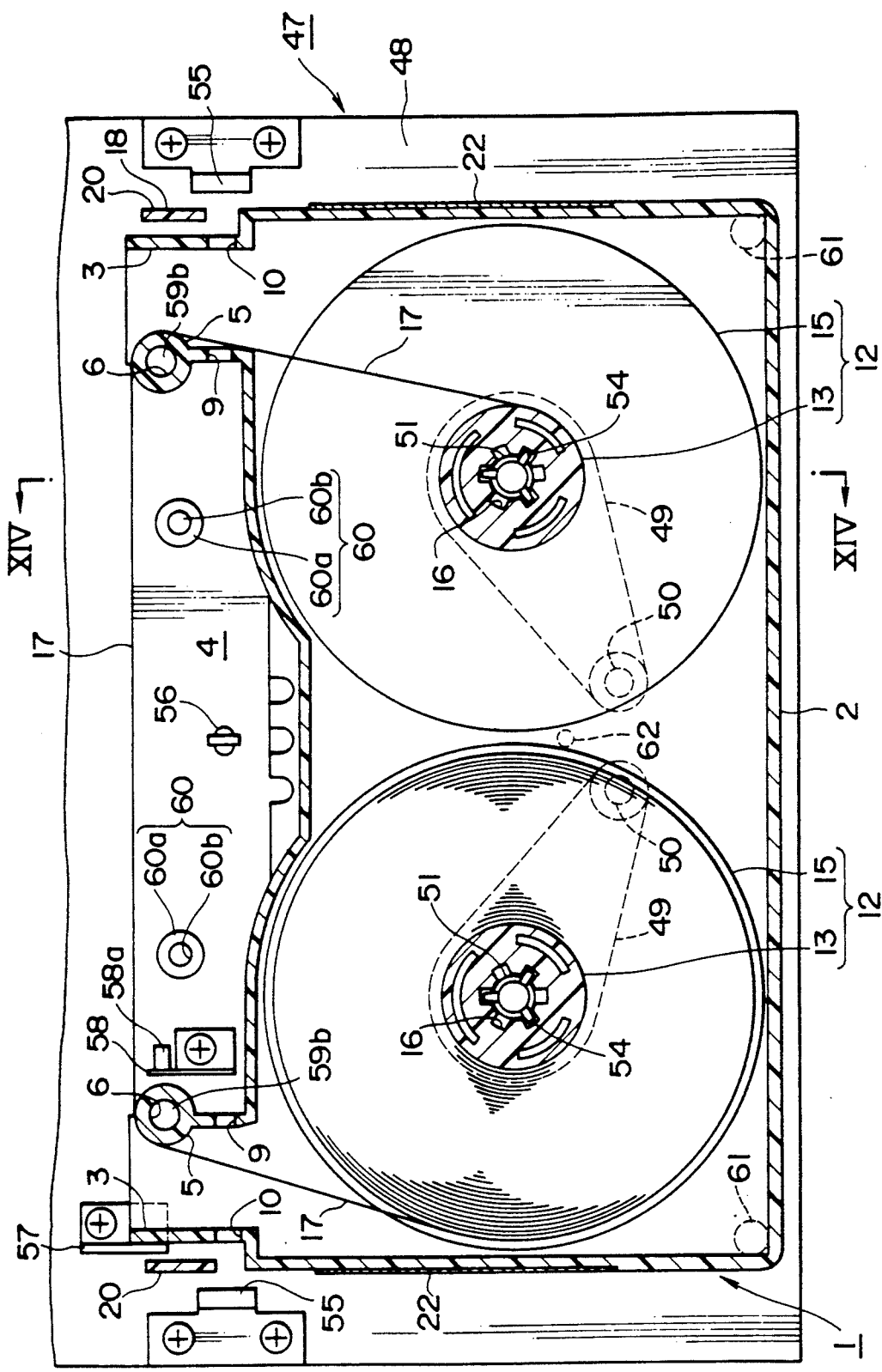
FIG. 13 is a horizontal sectional view of the large size tape cassette shown loaded on the deck portion of FIG. 11.

As shown in FIG. 13, a pair of light introducing holes 9 are formed in wall portions of the cassette casing 2 defining the opposite sides of the mouth portion 4. Another pair of light introducing holes 10 are formed in front end portions of the opposite left and right side walls of the cassette casing 2 and are aligned with the holes 9.

Figure 3:
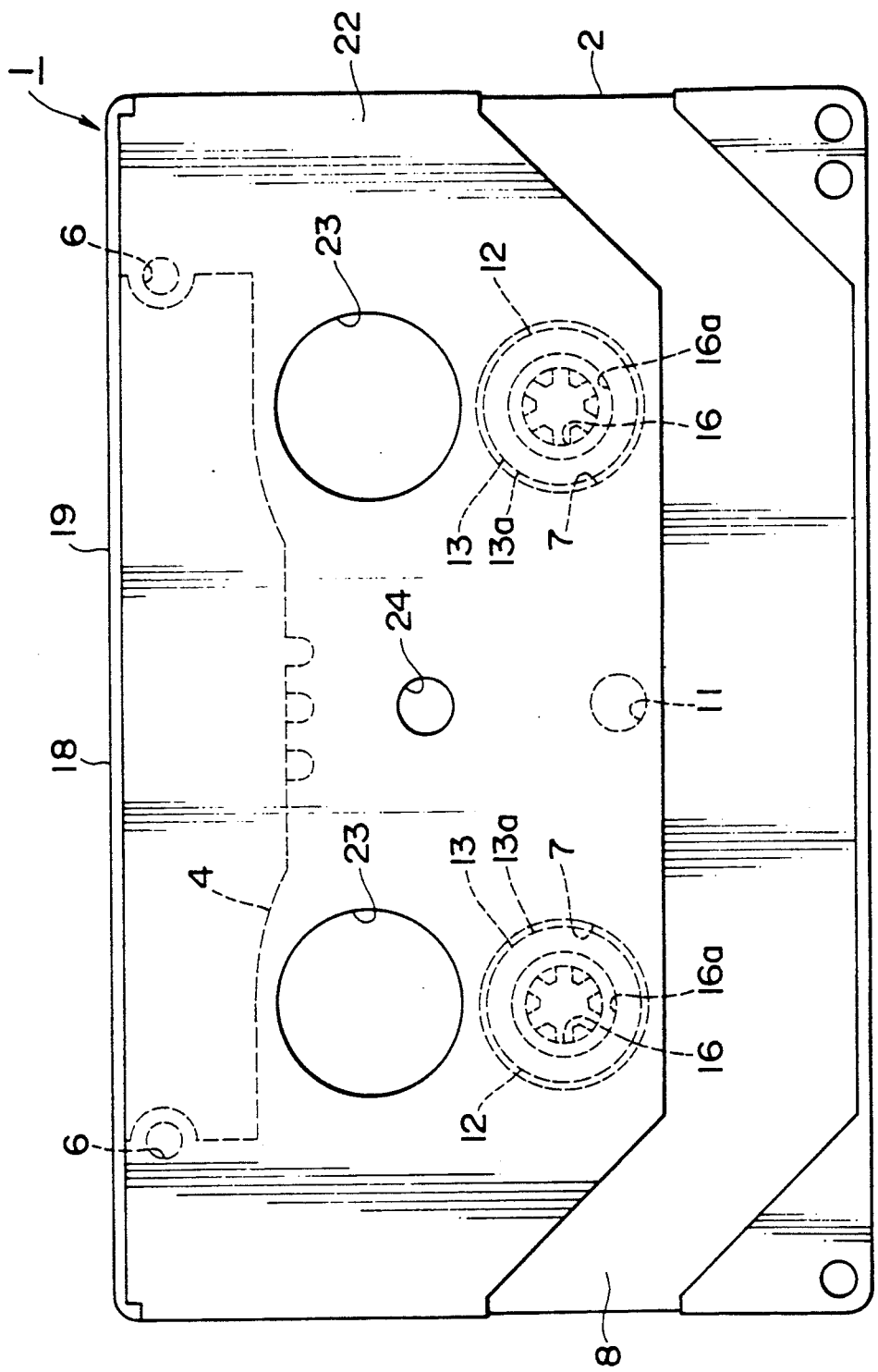
FIG. 3 is a bottom plan view of the large size tape cassette of FIG. 1 shown with its front lid and shutter in their respective closed positions.
Figure 4:
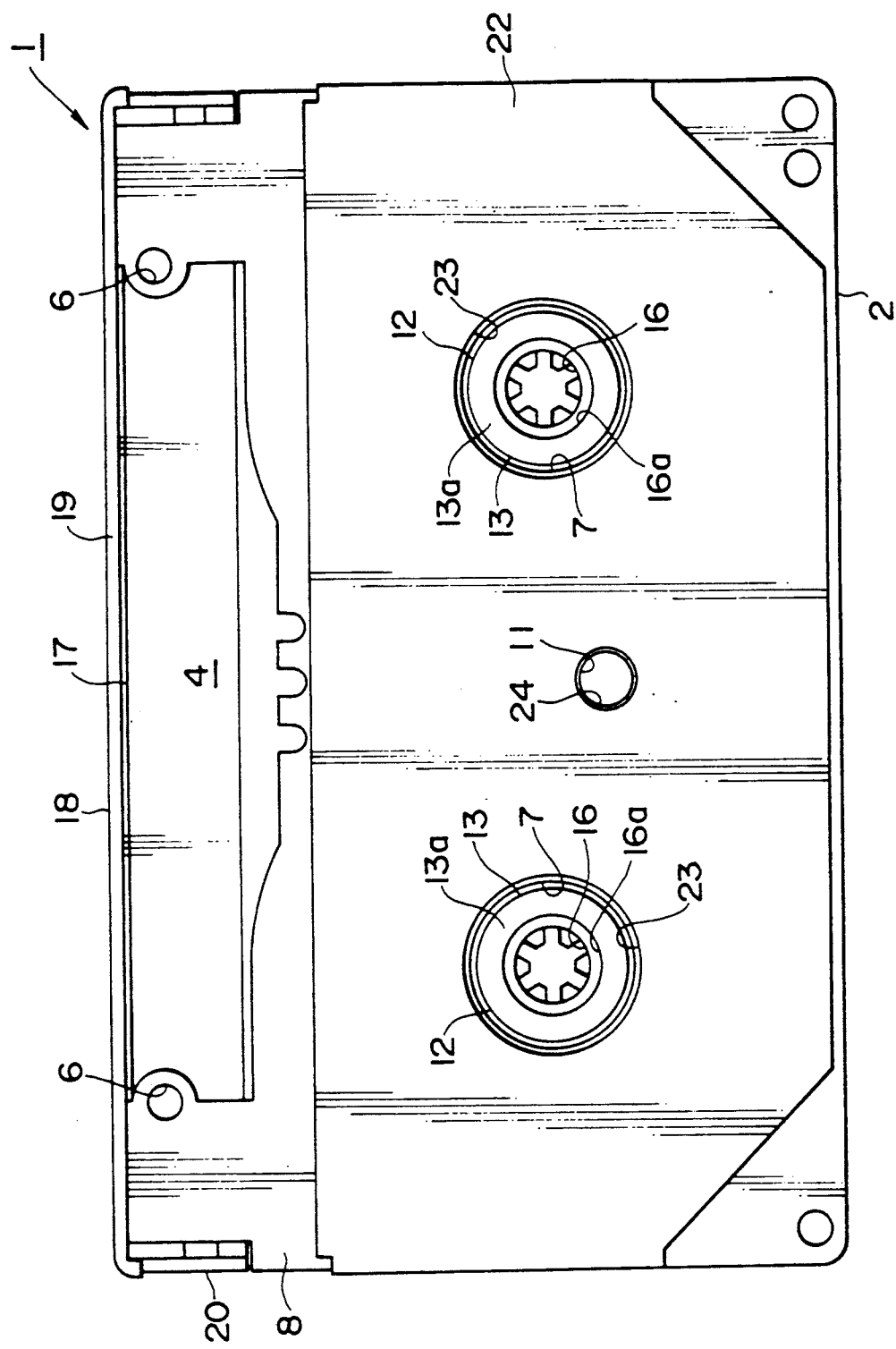
FIG. 4 is a view similar to that of FIG. 3, but showing the large size tape cassette with its front lid and shutter in their respective opened positions.
Figure 5:
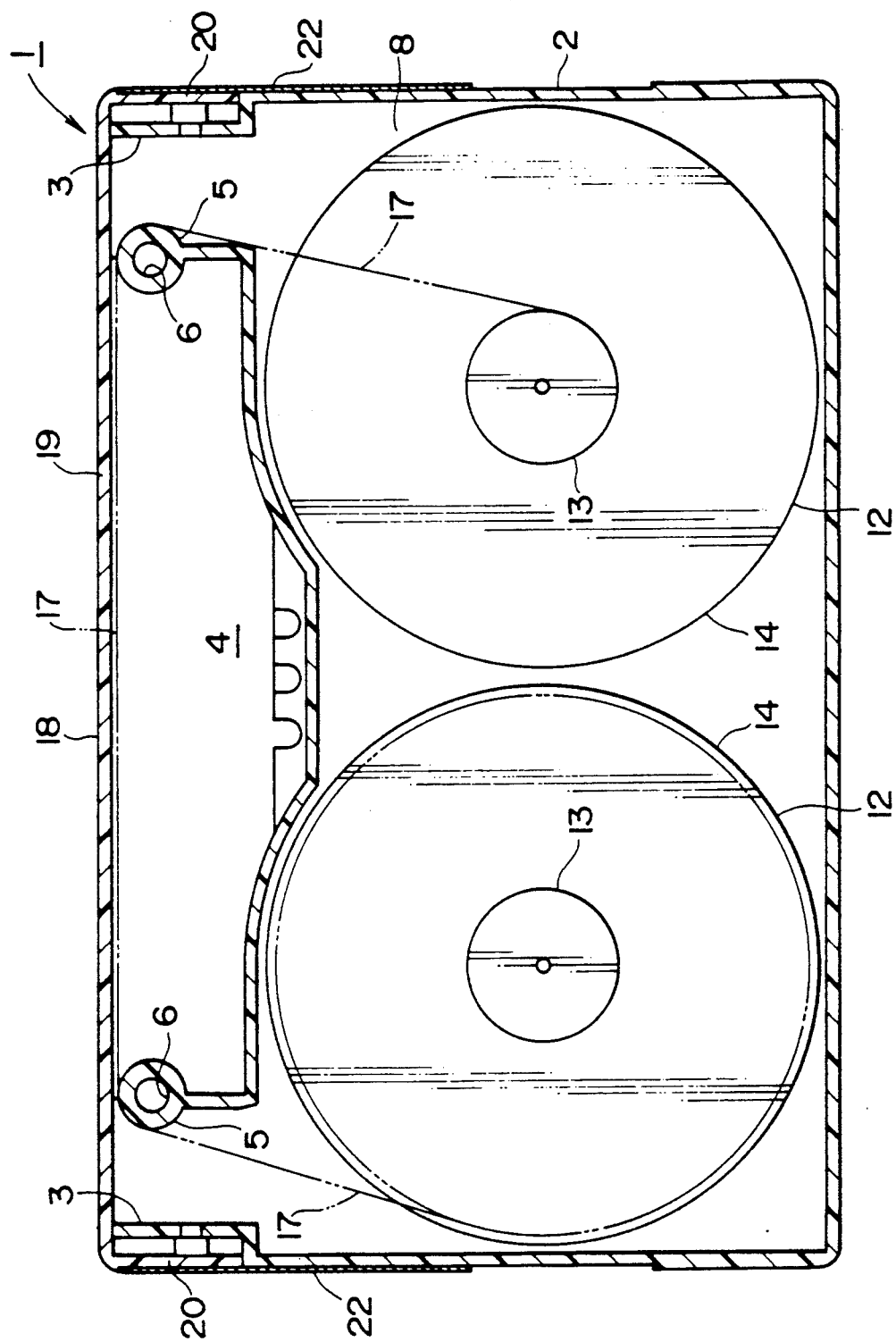
FIG. 5 is a horizontal sectional view of the large size cassette.

As shown in FIGS. 3 and 4, an escape hole 11 is formed in the bottom wall 8 at a position a little to the rear of a central position between the access holes 7.

Figure 17A:
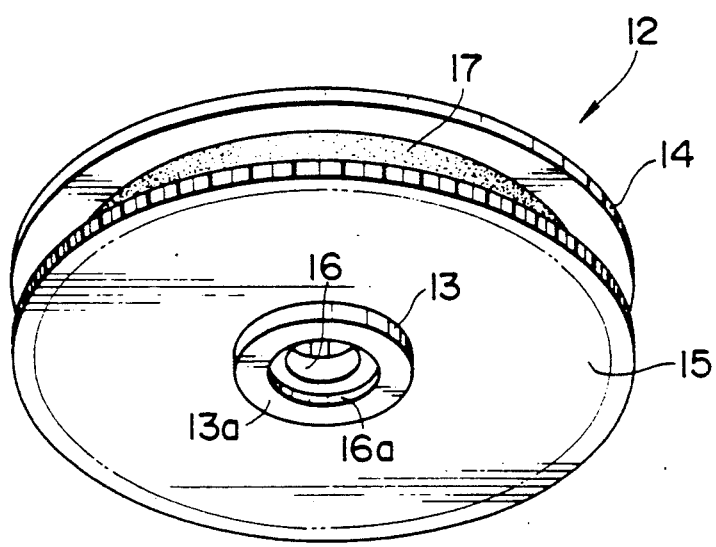
FIGS. 17A and 17B are perspective views showing tape reels of the large and small size tape cassettes, respectively.

A pair of tape reels 12 are rotatably accommodated in the cassette casing 2. As shown in FIG. 17A, each of the tape reels 12 includes a cylindrical reel hub 13, and a pair of upper and lower flanges 14 and 15 formed or mounted integrally at the opposite upper and lower end portions of the reel hub 13. The reel hub 13 extends, at the lower end portion 13a thereof, a little downwardly from the lower flange 15. The extent of the lower extension 13a of the reel hub 13 is equal to or smaller than the thickness of the bottom wall 8 of the cassette casing 2. the lower extension 13a has an outer diameter smaller than the inner diameter of the access holes 7 of the cassette casing 2.

The reel hub 13 of each of the tape reels 12 has a coaxial reel spindle engaging hole 16 therein opening at the lower end thereof. The reel spindle engaging hole 16 is increased in diameter at a lower end portion 16a thereof. Details of the dimensions of the increased diameter portion 16a will be hereinafter described.

A magnetic tape 17 is fixed at its opposite ends to, and wound on the reel hubs 13 of the tape reels 12. The tape reels 12 are rotatably accommodated in the cassette casing 2 with the lower extensions 13a of the reel hubs 13 thereof being loosely positioned within the holes 7 of the cassette casing 2. The magnetic tape 17 between the reels 12 is led out from the casing 2 through the tape exits 3 to the outside of the cassette casing 2, and such led out portion of the magnetic tape 17 is positioned by the spindles 5 in a straight run 17a extending across the front of the cassette casing 2.

A front lid 18 is supported for pivotal motion at the front portion of the cassette casing 2 The front lid 18 is formed as a unitary member and has a front face portion 19 in the form of a laterally elongated plate which, in the closed position of the lid 15 (FIG. 1), covers the front of the cassette casing 2, a pair of side portions 20 extending rearwardly from the opposite left and right ends of the front face portion 19, and an upper face portion 21 having a front edge contiguous to an upper edge of the front face portion 19 and a pair of left and right side edges contiguous to upper edges of the said portions 20. The side portions 20 of the front lid 18 are supported for pivotal motion on the left and right sides of a front end portion of the cassette casing 2.

Figure 2:
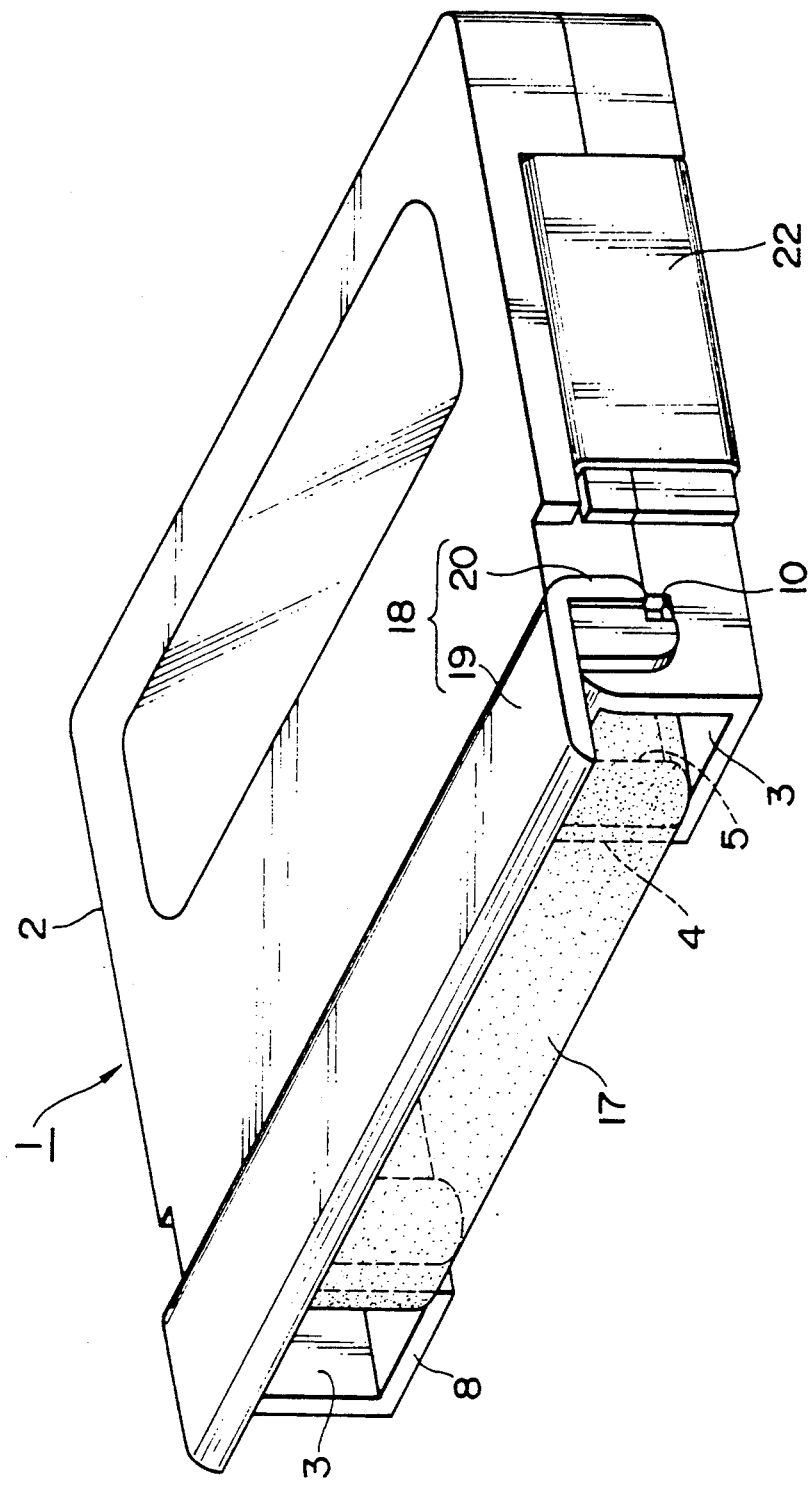
FIG. 2 is a view similar to that of FIG. 1 but showing the large size tape cassette with its front lid and shutter in their respective opened positions.

The front lid 18 is normally biased in a closing direction by a spring means (not shown) so that it is positioned, when the large size tape cassette 1 is not in use, in its closed position shown in FIG. 1 and at which the front face portion 19 covers over the front side of the portion of the magnetic tape 17 led out to the outside of the cassette casing 2 When the large size tape cassette 1 is loaded into a video tape recorder, the front lid 18 is pivoted by a lid opener, which will be hereinafter described, to its opened position at which it exposes the front side of the magnetic tape run 17a, as seen in FIG. 2.

A shutter 22 is supported for sliding movement in the forward and rearward directions on the bottom of the cassette casing 2 and is normally biased forwardly by a spring means (not shown), to the position shown on FIG. 3, similarly to a conventional tape cassette for use in a digital audio tape recorder.

The shutter 22 has a pair of reel spindle access holes 23 (FIGS. 3 and 4) in laterally spaced relationship therein. The shutter 22 further has a single exposing hole 24 formed therein between holes 23.

When the shutter 22 is at the front end of a range of movement thereof, that is, at its closed position (FIG. 3), the reel spindle access holes 23 and the exposing hole 24 formed therein are displaced from the access holes 7 and the escape hole 11 of the cassette casing 2. Consequently, the access holes 7 and the escape hole 11 of the cassette casing 2 are closed by the shutter 22. Further, the bottom of the mouth portion 4 of the cassette casing 2 is closed by the front end portion of the shutter 22 as seen in FIG. 3. Accordingly, the mouth portion 4 is closed at the front thereof by the front lid 18 and at the bottom thereof by the shutter 22 and thus presents a substantially sealed condition wherein the tape 17 is protected completely against contaminants from outside the cassette.

When the tape cassette 1 is operatively positioned in a video tape recorder, the shutter 22 is retracted to its opened position similarly as in a tape cassette for a digital audio tape recorder. When the shutter 22 is in its opened position, the reel spindle access holes 23 of the shutter 22 coincide with the respective holes 7 of the cassette casing 2 so that the reel spindle engaging holes 16 of the tape reels 12 are individually exposed to the outside through the aligned holes 7 and 23. Meanwhile, the exposing hole 24 of the shutter 22 coincides with the escape hole 11 of the cassette casing 2 so that the escape hole 11 is exposed to the outside as seen from FIG. 4.

Referring now to FIGS. 6 to 10, there is shown a tape cassette of a small size. The small size tape cassette is generally denoted at 25 and has a size about two fifths that of the large size tape cassette 1 as viewed in plan. The small size tape cassette 25 includes a cassette casing 26 which is in the form of a flattened box having a transversely elongated rectangular shape as viewed in plan and further having a pair of tape exits 27 formed at the opposite end portions of the front thereof. The cassette casing 26 has a lateral or leftward and rightward dimension substantially equal to the depth or forward and backward dimension of the cassette casing 2 of the large size tape cassette 1. Further, the cassette casing 26 has a depth or forward and backward dimension which is substantially two fifths of the lateral or leftward and rightward dimension of the cassette casing 2. Moreover, the lateral or leftward and rightward dimension of the cassette casing 26 is smaller than the lateral or leftward and rightward dimension of the mouth portion 4 of the large size tape cassette 1.

A mouth portion 28 is formed at the front of the cassette casing 26 between the tape exits 27 and opens forwardly and downwardly of the cassette casing 26. The mouth portion 28 provides access to the tape for a tape drawing out member (not shown).

A pair of upright cylindrical tape guides 29 are provided at the tape exits 27 adjacent the mouth portion 28. Each of the cylindrical tape guides 29 has a coaxial positioning hole 30 (FIGS. 9 and 10) opening at the bottom of the cassette casing 26. The distance between the positioning holes 30 is significantly smaller than the lateral or leftward and rightward dimension of the mouth portion 4 of the cassette casing 2 of the large size tape cassette 1.

A pair of access holes 31 are formed in laterally spaced relationship in a bottom wall 32 of the cassette casing 26 for exposing reel spindle engaging holes formed in hubs of tape reels, as will be hereinafter described.

Figure 15:
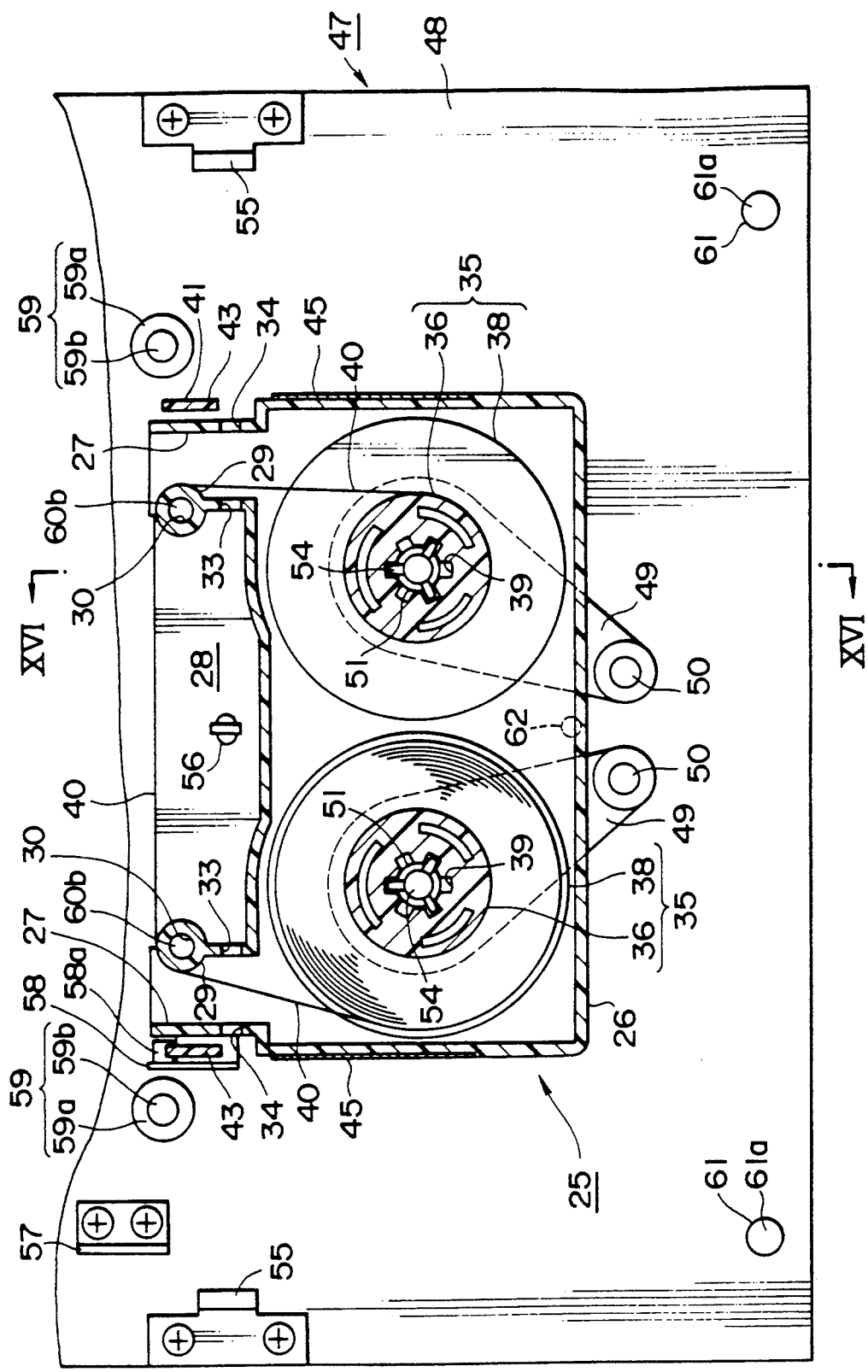
FIG. 15 is a horizontal sectional view of the small size tape cassette shown loaded on the deck portion of FIG. 12.

As shown on FIG. 15, a pair of light introducing holes 33 are formed in wall portions of the cassette casing 26 defining the opposite sides of the mouth portion 28. Another pair of light introducing holes 34 are formed in front end portions of the opposite left and right side walls of the cassette casing 26 so as to be aligned with the holes 33.

Figure 8:
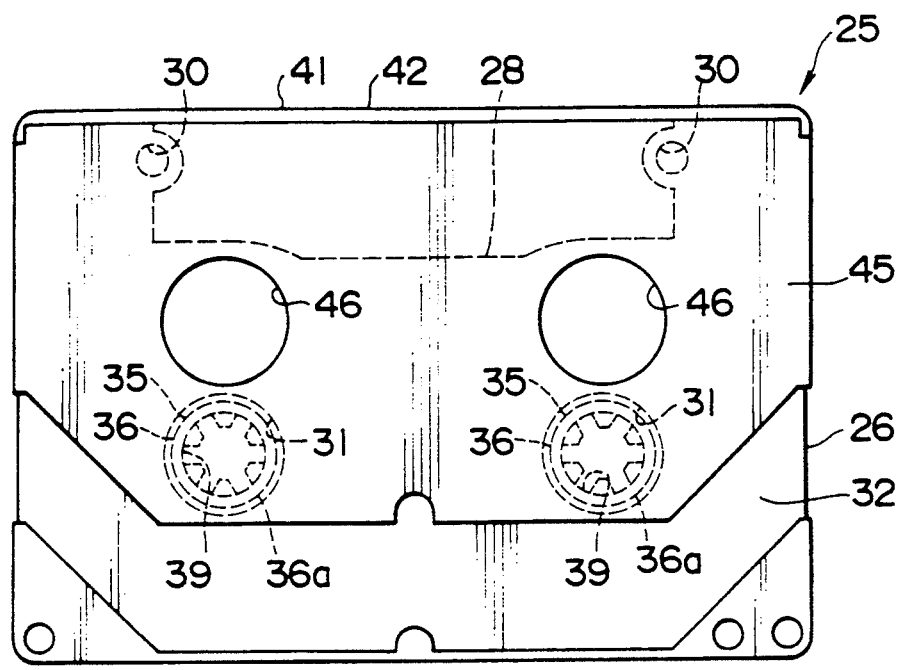
FIG. 8 is a bottom plan view of the small size tape cassette of FIG. 6 shown with its front lid and shutter in their respective closed positions.
Figure 9:
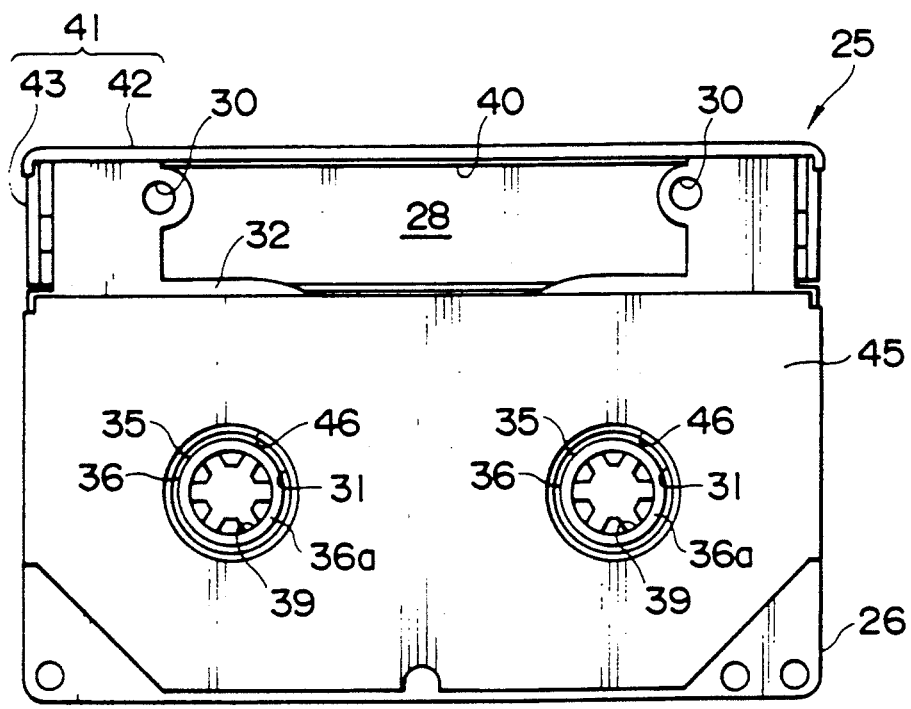
FIG. 9 is a view similar to that of FIG. 8, but showing the small size tape cassette with its front lid and shutter in their respective opened positions.
Figure 10:
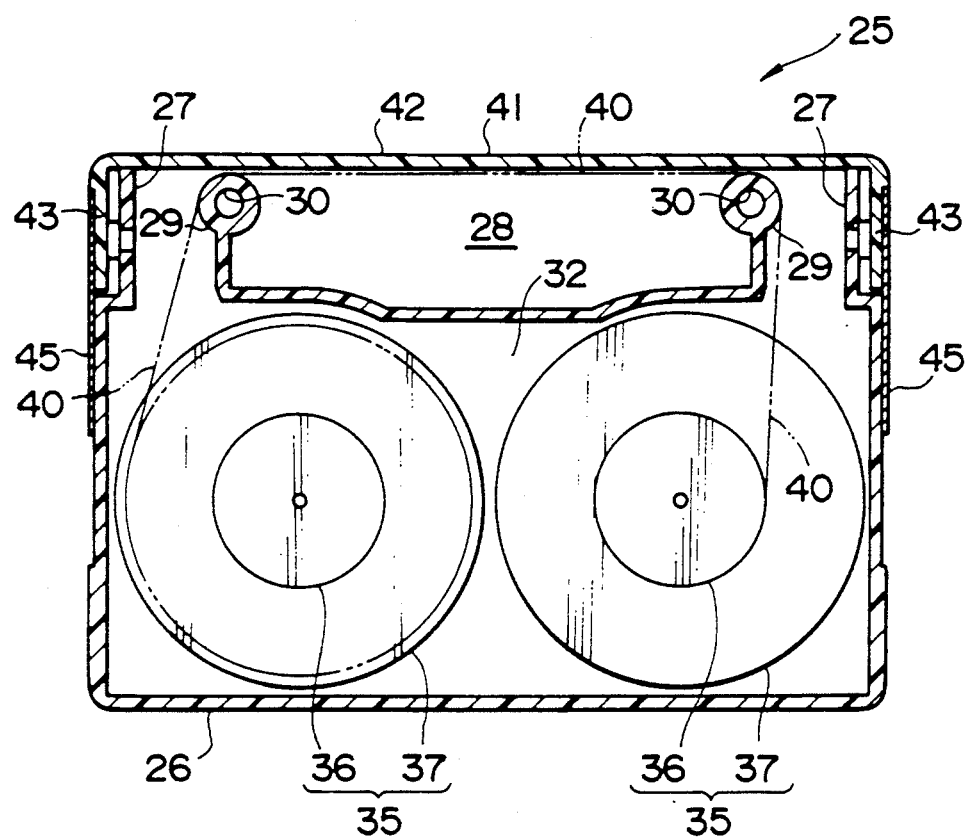
FIG. 10 is a horizontal sectional view of the small size cassette.
Figure 17B:
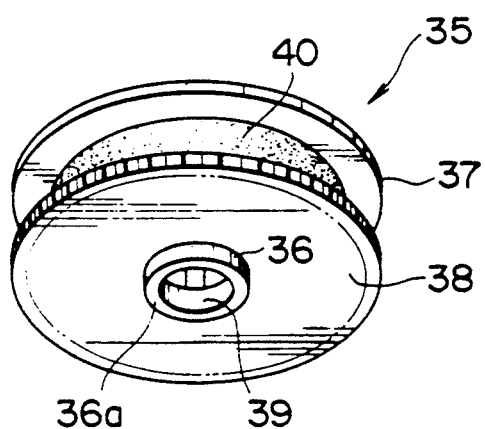

As shown on FIGS. 8 to 10, a pair of tape reels 35 are rotatably accommodated in the cassette casing 26. Each of the tape reels 35 is shown, particularly on FIG. 17B, to include a cylindrical reel hub 36, and a pair of upper and lower flanges 37 and 38 formed or mounted integrally at the upper and lower end portions of the reel hub 36. The reel hub 36 extends, at the lower end portion 36a thereof, a little downwardly from the lower flange 38. The extent of such downward extension 36a of the reel hub 36 is equal to or smaller than the thickness of the bottom wall 32 of the cassette casing 26. The lower extension 36a has an outer diameter smaller than the inner diameter of each of the access holes 31 of the cassette casing 26. The reel hub 36 of each of the tape reels 35 has a reel spindle engaging hole 39 opening at the lower end thereof.

A magnetic tape 40 is fixed at its opposite ends to, and wound on the reel hubs 36 of the tape reels 35. The tape reels 35 are accommodated for rotation in the cassette casing 26 with the lower extensions 36a of the reel hubs 36 thereof loosely positioned within the holes 31 of the cassette casing 26. The magnetic tape 40 between the reels 35 is led out from the casing 26 through the tape exits 27 to the outside of the cassette casing 26, and such led out portion of the magnetic tape 40 is positioned by the guides 29 in a straight run 40a extending across the front of the cassette casing 26.

A front lid 41 is supported for pivotal motion at the front of the cassette casing 26. The front lid 41 is formed as a unitary member and has a front face portion 42 in the form of a laterally elongated plate which, in the closed position of the lid 41 (FIG. 6), covers the front of the cassette casing 26, a pair of side portions 43 extending rearwardly from the opposite left and right ends of the front face portion 42, and an upper face portion 44 having a front edge contiguous to an upper edge of the front face portion 42 and a pair of left and right side edges contiguous to upper edges of the side portions 43. The side portions 43 of the front lid 41 are suitably supported for pivotal motion on the left and right sides of a front end portion of the cassette casing 26.

Figure 6:
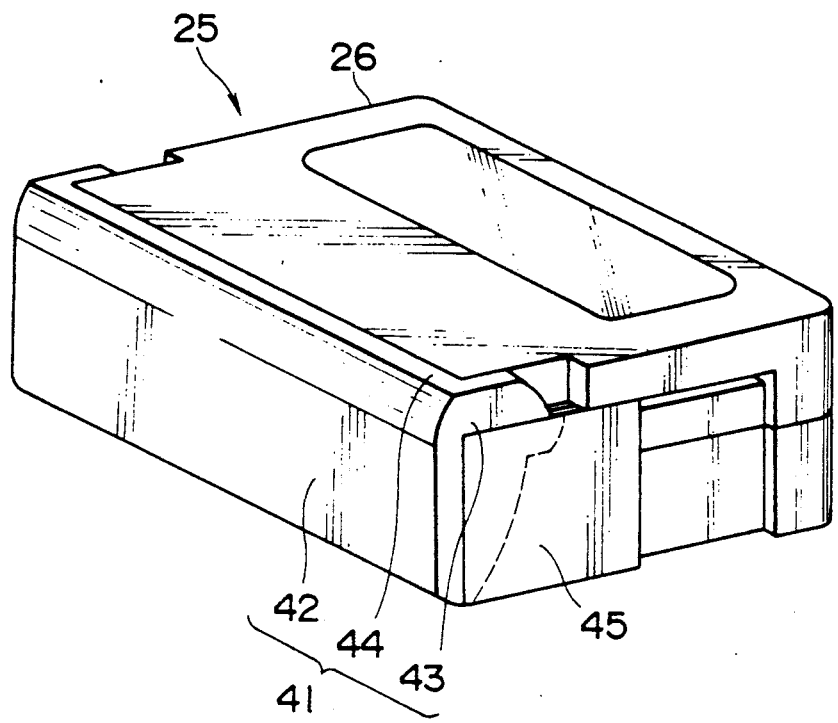
FIG. 6 is a perspective view showing a small size tape cassette according to an embodiment of the present invention, and which is shown with a front lid and a shutter of the cassette in their respective closed positions.
Figure 7:
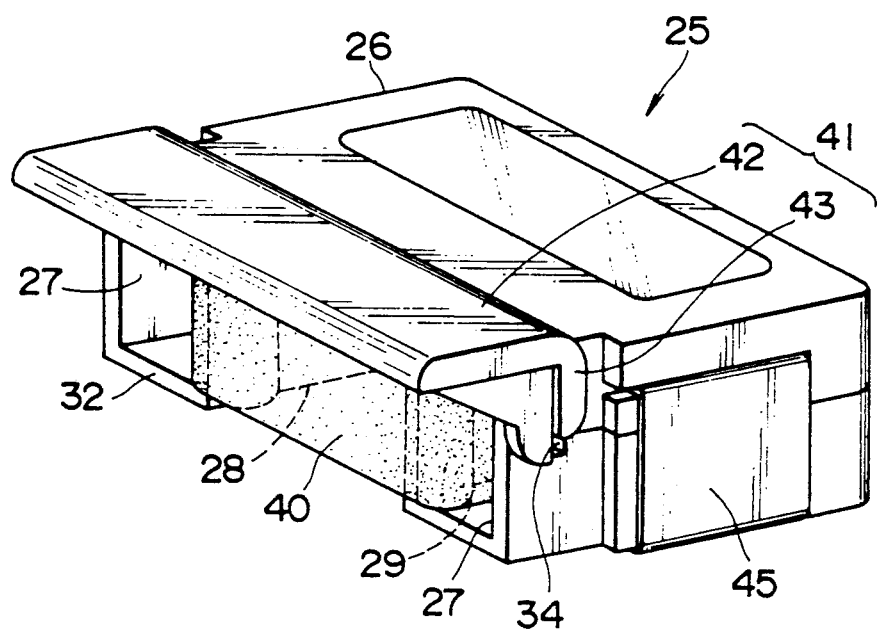
FIG. 7 is a view similar to that of FIG. 6, but showing the small size tape cassette with its front lid and shutter in their respective opened positions.

The front lid 41 is normally biased in a closing direction by a spring means (not shown) so that it is positioned, when the small size tape cassette 25 is not in use, in its closed position shown in FIG. 6 at which the front face portion 42 covers the front side of the run 40a of the magnetic tape 40 led out to the outside of the cassette casing 26. When the small size tape cassette 25 is loaded into a video tape recorder, the front lid 41 is pivoted by another lid opener, which will be hereinafter described, to its opened position at which it exposes the front side of the magnetic tape run 40a as seen in FIG. 7.

A shutter 45 is supported for sliding movement in the forward and rearward directions on the bottom of the cassette casing 26 and is normally biased forwardly by a spring means (not shown) similarly to a conventional tape cassette for use in a digital audio tape recorder. The shutter 45 has a pair of reel spindle access holes 46 (FIGS. 8 and 9) in laterally spaced relationship therein.

When the shutter 45 is at the front end of a range of movement thereof, that is, at its closed position (FIG. 8) the reel spindle access holes 46 formed in the shutter 45 are displaced from the access holes 31 of the cassette casing 26. Consequently, the holes 31 of the cassette casing 26 are closed by the shutter 45. Further, in the closed position of the shutter 45, the bottom of the mouth portion 28 of the cassette casing 26 is closed by the front end portion of the shutter 45, as seen in FIG. 8. Accordingly, the mouth portion 28 is closed at the front thereof by the front lid 41 and at the bottom thereof by the shutter 45 and there is no access from the outside to the interior of the casing 26 through the mouth portion 28.

When the tape cassette 25 is loaded into a video tape recorder, the shutter 45 is retracted to its opened portion similarly to a tape cassette for a digital audio tape recorder. When the shutter 45 comes to its opened position (FIG. 9), the reel spindle access holes 46 of the shutter 45 coincide individually with the access holes 31 of the cassette casing 26 so that the reel spindle engaging holes 39 of the tape reels 35 are exposed to the outside through the aligned access holes 31 and 46.

Referring now to FIGS. 11 to 16, there is shown a deck portion of a video tape recorder according to the present invention in which the tape cassettes 1 and 25 described above can be selectively used. The illustrated video tape recorder is generally denoted at 47 and includes a chassis 48 on which a pair of reel spindle supporting arms 49 are supported for individual pivotal motion about upright support shafts 50 which are mounted in laterally spaced relationship at mid portions of the rear half of the chassis 48.

Upstanding reel spindles 51 are rotatably supported a ends of the reel spindle supporting arms 49 remote from support shafts 50. Each of the reel spindles 51 has a disk-shaped reel receiving portion 52, a gear portion 53 formed integrally on a lower face of the receiving portion 52, and a reel engaging shaft 54 extending upwardly from the top end of the receiving portion 52. The receiving portion 52 of each reel spindle 51 is stepped to include a relatively large diameter lower portion 52a for receiving a large size cassette, and a relatively small diameter upper portion 52b for receiving a small size cassette. Thus, the small size cassette receiving portion 52b extends above and is smaller in diameter than the large size cassette receiving portion 52a. The inner diameter of the increased diameter portion 16a of the reel spindle engaging hole 16 of each tape reel 12 of the large size tape cassette 1 is larger than the outer diameter of the small size cassette receiving portion 52b of the receiving portion 52 of the reel spindle 51 but smaller than the outer diameter of the large cassette receiving portion 52a. Further, the height of the increased diameter portion 16a is made a little greater than the height of the small size cassette receiving portion 52b above the large size cassette receiving portion 52a.

Figure 11:
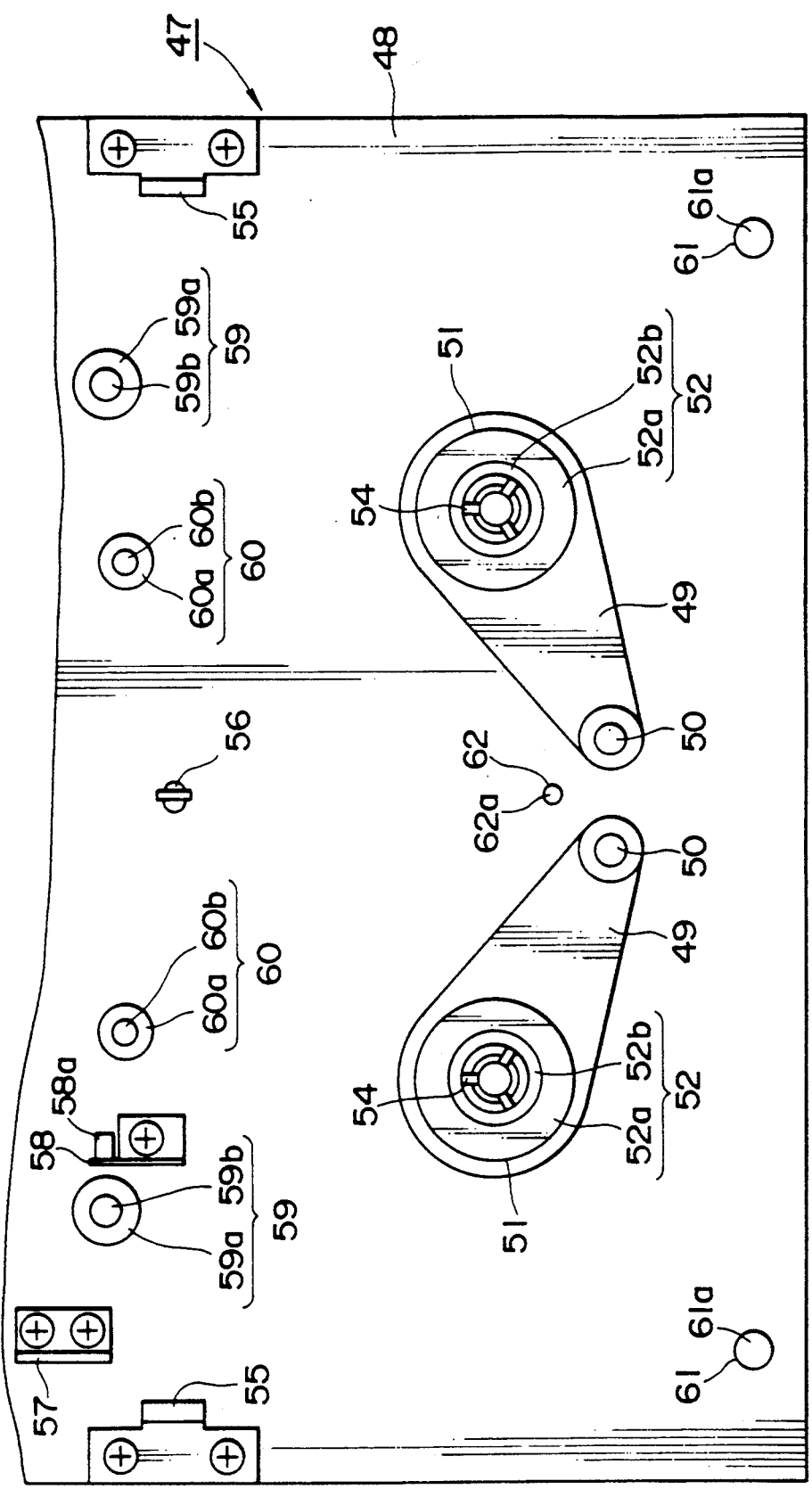
FIG. 11 is a plan view showing a deck portion of a video tape recorder according to an embodiment of the present invention and which is shown with a pair of reel spindles disposed at large size cassette driving positions.
Figure 12:
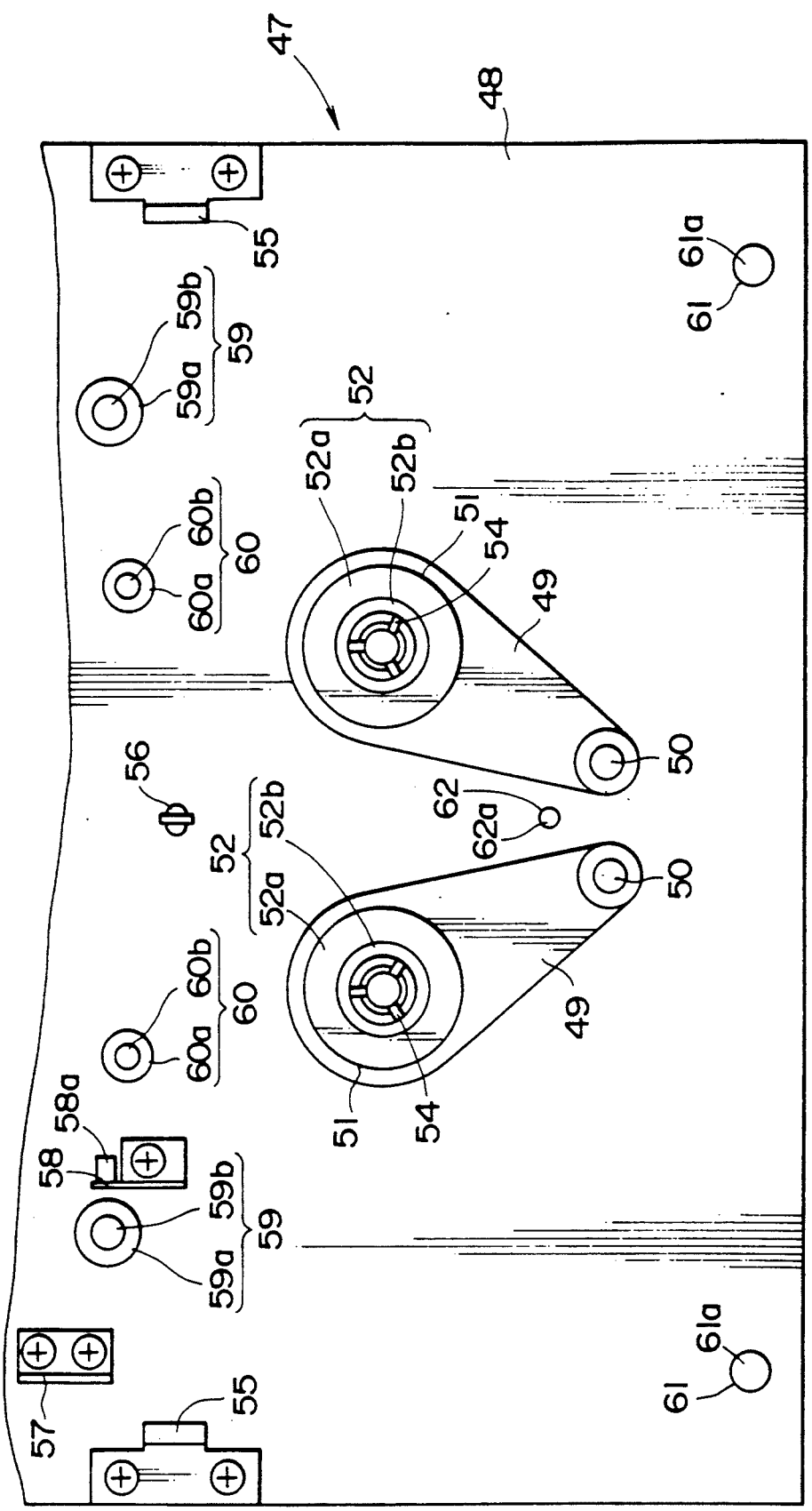
FIG. 12 is a view similar to that of FIG. 11, but showing the reel spindles disposed at small size cassette driving positions.

The reel spindle supporting arms 49 are mounted for pivotal movements between large size cassette driving positions shown in FIG. 11 and small size cassette driving positions shown in FIG. 12. At each of the large and small size cassette driving positions, a respective driving gear (not shown) is engagable with the gear 53 of either one of the reel spindles 51 for rotatably driving the same.

A pair of light receiving elements 55 (FIGS. 11, 12, 13, and 15) are disposed on the left and right end portions of the chassis 48 at positions displaced a little forwardly from the center in the forward and backward directions. A light emitting element 56 is disposed at a central position between and in lateral alignment with the light receiving elements 55.

An upstanding lid opener 57 for a large size tape cassette 1 is disposed on the chassis 48 proximate to the light receiving element 55 which is on the left end portion of the chassis in FIG. 11. Another upstanding lid opener 58 for a small size tape cassette 25 is disposed on the chassis at a position displaced laterally from the lid opener 57 toward the light emitting element 56. A pressing pin 58a extends laterally inward from an upper end portion of the lid opener 58 for cooperation with a small tape cassette 25 as hereinafter described.

A pair of upstanding positioning pins 59 for a large size tape cassette 1 are provided on the chassis 48. Each of the positioning pins 59 has a cylindrical base or main portion 59a and a conical inserting portion 59b extending from an upper end face of the main portion 59a. The upper end face of the main portion 59a of each positioning pin 59 serves as a reference surface for establishing a vertical position of the cassette while position of the latter in a horizontal direction is performed by the inserting portion 59b. One of the positioning pins 59 is located between the lid openers 57 and 58 and is displaced from a mid-position therebetween a little toward the lid opener 58 for a small size tape cassette. The other positioning pin 59 is located symmetrically about the median of the chassis 48 relative to the first described positioning pin 59.

A pair of upstanding positioning pins 60 for a small size tape cassette 25 are also provided on the chassis 48. Each of the positioning pins 60 has a cylindrical base or main portion 60a and a conical inserting portion 60b extending from an upper end face of the main portion 60a. The upper end face of the main portion 60a of each positioning pin 60 serves as a reference surface for establishing a vertical position of the cassette 25 while positioning of the latter in a horizontal direction is performed by the inserting portion 60b. One of the positioning pins 60 is located adjacent the lid opener 58 and is displaced a small distance therefrom toward the light emitting element 56. The other positioning pin 60 is located symmetrically about the median of the chassis 48 relative to the last described positioning pin 60.

A pair of upright vertical position defining pins 61 for a large size tape cassette are mounted on the chassis 48 at positions displaced substantially rearwardly from the positioning pins 59 and laterally outward relative to the latter. Each of the vertical position defining pins 61 has an upper end face 61a which serves as a reference surface.

An upright vertical position defining pin 62 for the small size tape cassette 25 is mounted at a position o the chassis 48 displaced a little forwardly from a mid position between the support shafts 50. The vertical position defining pin 62 has an upper end face 62a which serves as a reference surface.

The top end faces of the main portions 59a of the positioning pins 59 lie substantially in the same horizontal plane as the reference faces 61a of the vertical position defining pins 61, and the top end faces of the main portions 60a of the positioning pins 60 lie substantially in the same horizontal plane as the reference face 62a of the vertical position defining pin 62. The horizontal plane containing the top end faces of the main portions 60a of the positioning pins 60 and the reference face 62a of the vertical position defining pin 62 is positioned a little higher than the horizonal plane containing the top end faces of the main portions 59a of the positioning pins 59 and the reference faces 61a of the vertical position defining pins 61. Therefore, when in its operative position on the chassis 48, the small size tape cassette 25 is positioned with its under surface at a higher level than the under surface of the large size tape cassette 1 in its operative position and, accordingly, as is apparent from FIGS. 14 and 16, the bottom wall 8 of the large size tape cassette 1 is formed with a greater thickness than the bottom wall 32 of the small size tape cassette 25.

It is to be noted that, while the video tape recorder 47 further includes various members, such as, a head drum, a tape drawing out member, tape guides and a tension regulator, those members may be conventional and form no part of the present invention so as to justify their omission form the drawings and this description.

Large and small size tape cassettes 1 and 25 of the types described hereinabove are used in the following manner on the video tape recorder 47. First, use of the small size tape cassette 25 will be described.

A small size tape cassette 25 is initially inserted horizontally into a cassette holder (not shown) of the video tape recorder 47, and, in the course of such insertion, the shutter 45 is conventionally moved to its opened position similarly to a tape cassette for a digital audio tape recorder. Further, the small size tape cassette 25 inserted in the cassette holder is conventionally detected by detecting means (note shown) and, in response to such detection, the reel spindle supporting arms 49 are suitably pivoted to their small size cassette driving positions (FIGS. 12 and 15).

Figure 16:
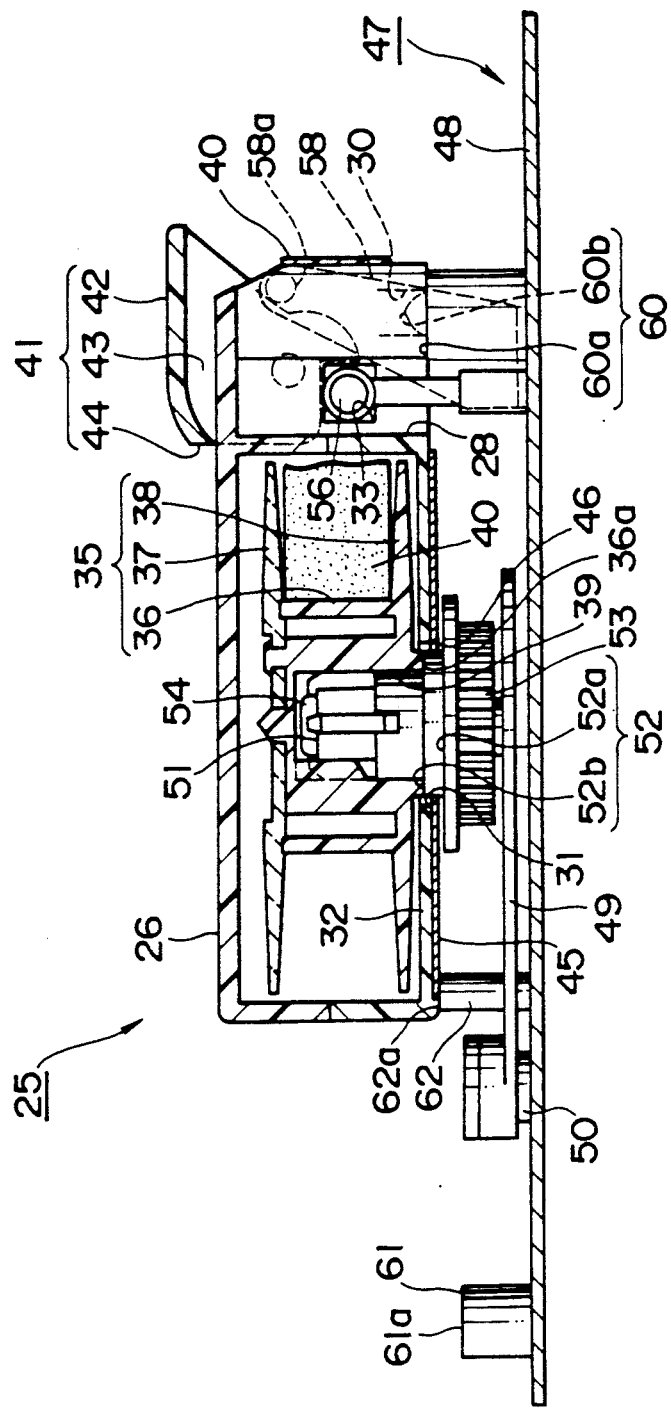
FIG. 16 is an enlarged sectional view taken along line XVI—XVI of FIG. 15.

Then, the cassette holder is conventionally moved downwardly until the tape cassette 25 is moved therewith toward its mounted operative position at which the reel engaging shafts 54 of the reel spindles 51 are engaged in the reel spindle engaging holes 39 of the tape reels 35 of the tape cassette 25. Eventually, the lower ends of the reel hubs 36 of the tape reels 35 are seated on the small size cassette receiving portions 52b of the receiving portions 52 of the reel spindles 51 (FIG. 16). When the lower ends of the reel hubs 36 are thus seated, the lower flanges 38 of the tape reels 35 are raised slightly above the inner surface of the bottom wall 32 of the cassette casing 26.

Further, while the cassette holder is being moved downwardly as described above, an end portion of the pressing pin 58a of the lid opener 58 is engaged by a lower end of a corresponding one of the side portions 43 of the front lid 41, and as the tape cassette 25 is further moved downwardly, the pressing pin 58a relatively pushes the lower edge of the side portion 43 of the front lid 41 in the upward direction so that the front lid 41 is moved to its opened position (FIG. 16).

During the final increment of downward movement of the cassette casing 26 with the cassette holder, the conical portions 60b of the positioning pins 60 are inserted into the positioning holes 30 so that the tape cassette 25 is accurately positioned in the horizontal direction. Finally, the upper end faces of the main portions 60a of the positioning pins 60 are abutted by circumferential edge portions of the openings of the positioning holes 30 while the reference surface 62a of the vertical position defining pin 62 is abutted by the bottom surface of the bottom wall 32 of the cassette casing 26, thereby defining the vertical position of the tape cassette 25.

Thereafter, the magnetic tape 40 is conventionally withdrawn from the cassette casing 26 and is loaded about a guide drum (not shown) so that a reproducing operation or a recording operation of the video tape recorder can be performed.

The light emitting element 56 is positioned within the mouth portion 28 of the tape cassette 25, and the light introducing holes 33 and 34 of the tape cassette 25 are aligned with a straight light path interconnecting the light emitting element 56 and the light receiving elements 55. When the magnetic tape 40 is fully wound on one of the reels 35, a transparent portion at an end of the magnetic tape 40 is interposed in the light path, so that light from the light emitting element 56 is received by one of the light receiving elements 55, thereby detecting the end of the magnetic tape 40.

Use of the large size tape cassette 1 will now be described.

The large size tape cassette 1 is initially inserted horizontally into the cassette holder (not shown) and, in the course of such insertion, the shutter 22 is suitably moved to its opened position. Further, the large size tape cassette 1 thus inserted in the cassette holder is detected, and, in response to such detection, the reel spindle supporting arms 49 are suitably pivoted to their large size cassette driving positions (FIGS. 11 and 13).

Figure 14:
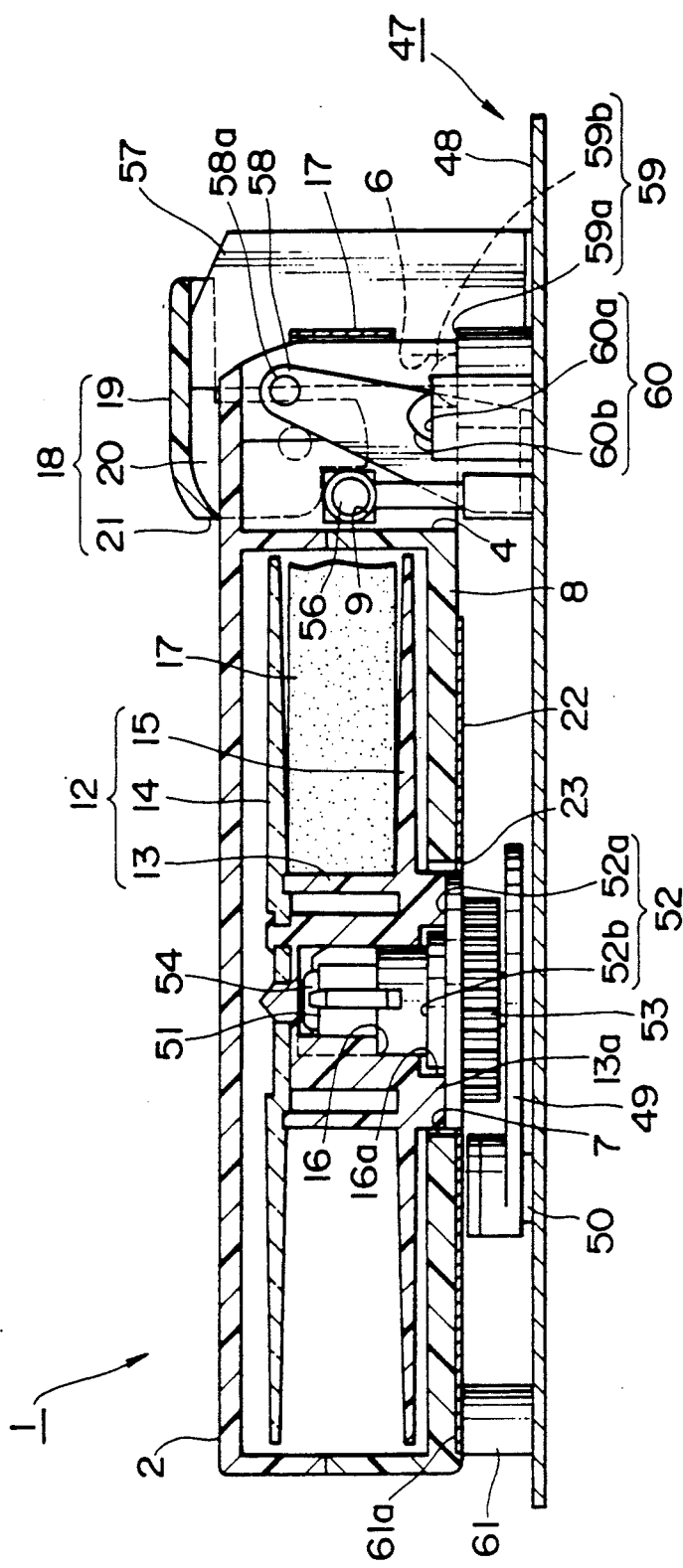
FIG. 14 is an enlarged sectional view taken along line XIV—XIV of FIG. 13.

Then, the cassette holder is moved downwardly until the tape cassette 1 is moved therewith toward its mounted operative position at which the reel engaging shafts 54 of the reel spindles 51 are engaged in the reel spindle engaging holes 16 of the tape reels 12 of the tape cassette 1. Eventually, the lower ends of the reel hubs 13 of the tape reels 12 are seated on the large size cassette receiving portions 52a of the receiving portions 52 of the reel spindles 51 (FIG. 14). When the lower ends of the reel hubs 13 are thus seated, the final increment of downward movement of the casing 2 with the cassette holder raises the lower flanges 15 of the tape reels 12 slightly above the inner surface of the bottom wall 8 of the cassette casing 2. In this instance, the small size cassette receiving portions 52b of the receiving portions 52 of the reel spindles 51 are positioned within the increased diameter portions 16a of the reel spindle engaging holes 16 of the tape reels 12 of the large size tape cassette 1.

Further, during the downward movement of the cassette casing 2 with the holder, an upper edge of the lid opener 57 is abutted by a lower edge of the front face portion 19 of the front lid 18 at a position near a corresponding one of the side portions 20, and then, as the cassette holder and hence the tape cassette 1 are further moved downwardly, the upper edge of the lid opener 57 relatively pushes the lower edge of the front face portion 19 of the front lid 18 upwardly so that the front lid 18 is moved to its opened position (FIG. 14).

Finally, the conical portions 59b of the positioning pins 59 are inserted into the positioning holes 6 so that the tape cassette 1 is accurately positioned in the horizontal direction, and the upper end faces of the main portions 59a of the positioning pins 59 are abutted by circumferential edge portions of the openings of the positioning holes 6 while the reference surfaces 61a of the vertical position defining pins 61 are abutted by the bottom face of the bottom wall 8 of the cassette casing 2, thereby accurately defining or establishing the vertical position of the tape cassette 1.

When the large size tape cassette 1 is thus mounted in its operative position in the video tape recorder 47, the lid opener 58 for a small size tape cassette, the positioning pins 60 for a small size tape cassette and the light emitting element 56 are positioned within the mouth portion 4 of the large size tape cassette 1. Further, the light introducing holes 9 and 10 of the tape cassette 1 are aligned with the straight light path interconnecting the light emitting element 56 and the light receiving elements 55. Furthermore, the vertical position defining pin 62 for the small size tape cassette 25 is received, at an upper end portion thereof, in the escape hole 11 of the large size tape cassette 1. Accordingly, there is no trouble even if the reference face 62a of the position defining pin 62 is at a higher position than the lower face of the bottom wall 8 of the large size tape cassette 1.

Thereafter, the magnetic tape 40 is conventionally withdrawn from cassette casing 2 and loaded about a guide drum or the like so that a reproducing operation or a recording operation of the video tape recorder can be performed.

Having now fully described an illustrative embodiment of the invention, it will be apparent that the invention is not limited to that precise embodiment, and that many changes and modifications may be effected therein by one skilled in the art without departing from the spirit and scope of the invention as defined in the appended claims.

What is claimed is:

1. A tape supplying and taking up apparatus capable of receiving two types of tape cassettes of large and small sizes, respectively, and which each contain a pair of tape reels, and a tape wound on said tape reels and having a tape portion extending therebetween, said tape supplying and taking up apparatus comprising:

a chassis;

large and small size tape cassette locating means on said chassis for selectively locating said large and small size tape cassettes in respective operative positions on said chassis; and a pair of reel spindles mounted on said chassis for engaging the pair of tape reels of either one of said large and small size tape cassettes when in its respective operative position, each of said reel spindles having a reel driving portion, a large size cassette receiving portion for receiving a respective tape reel of a large size tape cassette thereon, and a small size cassette receiving portion for receiving a respective tape reel of a small size tape cassette thereon, said reel driving portion, said large size cassette receiving portion, and said small size cassette receiving portion of each of said reel spindles being disposed in a relatively fixed coaxial relationship, said small size cassette receiving portion of each of said reel spindles having an outer diameter smaller than an outer diameter of said large size cassette receiving portion of the respective spindle and being fixedly disposed at a higher position than said large size cassette receiving portion of said respective spindle.

2. A tape supplying and taking up apparatus according to claim 1, wherein each of said large and small size tape cassettes has a respective mouth portion across which said tape portion extends between the respective tape reels, and a pivoted lid movable between closed and opened positions; and further comprising a lid opener for a small size tape cassette which is disposed on said chassis so as to be located within the mouth portion of a large size tape cassette when the large size tape cassette is in said operative position thereof.

3. A tape supplying and taking up apparatus according to claim 1, further comprising a light emitting element and a light receiving element disposed on said chassis so as to be operative for detecting a transparent portion at an end portion of a magnetic tape in either a large size tape cassette or a small size tape cassette in its respective operative position on said chassis.

4. A tape supplying and taking up apparatus according to claim 3, wherein said light emitting element is positioned on said chassis so as to be located in said mouth portion of either a large size tape cassette or a small size tape cassette in its respective operative position on said chassis.

5. A small size tape cassette for use with a tape supplying and taking up apparatus according to claim 1, wherein said large and small size cassette receiving portions are constituted by respective annular surfaces which are radially directed on said respective spindle, and each of said tape reels of said small size cassette has a hub with a reel spindle engaging hole having a lower end portion with a diameter smaller than said outer diameter of said annular surface constituting the small size cassette receiving portion of each of said reel spindles.

6. A small size tape cassette according to claim 5, further comprising a cassette casing having access holes for exposing the reel spindle engaging holes in the reel hubs and a mouth portion across which the tape portion extends between said reels, and a shutter mounted for sliding movement relative to said casing between a closed position at which said shutter closes said access holes and said mouth portion, and an opened position at which said shutter opens said access holes and said mouth portion.

7. A large size tape cassette for use with a tape supplying and taking up apparatus which is capable of alternatively receiving a small size tape cassette, and which comprises a chassis; large and small size tape cassette loading means on said chassis for selectively locating said large and small size tape cassettes in respective operative positions on said chassis; and a pair of reel spindles mounted on said chassis for engaging a pair of tape reels of either one of said large and small size tape cassettes when in its respective operative position, each of said reel spindles having a reel driving portion, a large size cassette receiving portion for receiving a respective tape reel of a large size tape cassette thereon, and a small size cassette receiving portion for receiving a respective tape reel of a small size tape cassette thereon, said reel driving portion, said large size cassette receiving portion, and said small size cassette receiving portion of each of said reel spindles being disposed in a coaxial relationship, said small size cassette receiving portion of each of said reel spindles having an outer diameter smaller than an outer diameter of said large size cassette receiving portion of the respective spindle and being disposed at a higher position than said large size cassette receiving portion of said respective spindle; each of said tape reels of the large size tape cassette including a hub with a reel spindle engaging hole having a lower end portion thereof with an inner diameter larger than said outer diameter of said small size cassette receiving portion of the reel spindle and smaller than said outer diameter of said large size cassette receiving portion, said lower end portion of the reel spindle engaging hole of each reel in said large size tape cassette being higher in height than the height of said small size cassette receiving portion.

8. A large size tape cassette according to claim 7, further comprising a cassette casing having access holes for exposing the reel spindle engaging holes in the respective reel holes and a mouth portion across which the tape portion extends between the reels, and a shutter mounted for sliding movement relative to said casing between a closed position at which said shutter closes said access holes and said mouth portion and an opened position at which said shutter opens said access holes and said mouth portion.

* * * * *